US009634889B2

(12) United States Patent
Gu et al.

(10) Patent No.: US 9,634,889 B2
(45) Date of Patent: Apr. 25, 2017

(54) METHOD FOR MIGRATING SERVICE OF DATA CENTER, APPARATUS, AND SYSTEM

(71) Applicant: HUAWEI TECHNOLOGIES CO.,LTD., Shenzhen, Guangdong (CN)

(72) Inventors: Jiongjiong Gu, Shenzhen (CN); Shengxiang Xu, Shenzhen (CN); Shuantai Guo, Shenzhen (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 0 days.

(21) Appl. No.: 15/134,388

(22) Filed: Apr. 21, 2016

(65) Prior Publication Data

US 2016/0234059 A1    Aug. 11, 2016

Related U.S. Application Data

(63) Continuation of application No. PCT/CN2014/091250, filed on Nov. 17, 2014.

(51) Int. Cl.
*G06F 15/173* (2006.01)
*H04L 12/24* (2006.01)
(Continued)

(52) U.S. Cl.
CPC ...... *H04L 41/0668* (2013.01); *H04L 12/4633* (2013.01); *H04L 41/0659* (2013.01); *H04L 45/00* (2013.01)

(58) Field of Classification Search
CPC ............ H04L 12/4633; H04L 41/0654; H04L 41/0668; H04L 41/0803; H04L 41/12;
(Continued)

(56) References Cited

U.S. PATENT DOCUMENTS 7,586,841 B2 * 9/2009 Vasseur ............... H04L 12/5695
370/218
7,808,889 B1 * 10/2010 Howard ............... G06F 11/1658
370/217

(Continued)

FOREIGN PATENT DOCUMENTS

CA      2781060 A1    12/2011
CN    101582773 A    11/2009
(Continued)

OTHER PUBLICATIONS

Farinacci et. al. "RFC 6830: The Locator/ID Separation Protocol (LISP)." Internet Engineering Task Force (IETF), Jan. 2013, pp. 1-75.*

(Continued)

*Primary Examiner* — Christopher Biagini
(74) *Attorney, Agent, or Firm* — Huawei Technologies Co., Ltd

(57) ABSTRACT

A method for migrating a service of a data center is disclosed. When an active data center is faulty, a tunnel processing device disables a locally-saved tunnel entry of a server in the active data center. After receiving a service access request packet from a customer edge router, the tunnel processing device acquires an IP address of a tunnel processing module deployed on a server in a standby data center according to an IP address of a destination virtual machine, encapsulates the service access request packet and routes the encapsulated packet to the tunnel processing module, so as to migrate a data center service from the active data center to the standby data center.

17 Claims, 11 Drawing Sheets

(51) Int. Cl.
H04L 12/46 (2006.01)
H04L 12/701 (2013.01)

(58) Field of Classification Search
CPC ....... H04L 45/22; H04L 45/28; H04L 45/586; H04L 67/1002; H04L 67/1034; H04L 67/2861; H04L 69/40; H04L 41/0659; H04L 45/00
See application file for complete search history.

(56) References Cited

U.S. PATENT DOCUMENTS

| | | | |
|---|---|---|---|
| 8,051,322 B2* | 11/2011 | Matsumoto | H04L 12/4633 714/13 |
| 9,276,871 B1* | 3/2016 | Freitas | H04L 61/2007 |
| 2008/0291910 A1* | 11/2008 | Tadimeti | H04L 45/22 370/389 |
| 2009/0287955 A1 | 11/2009 | Matsumoto et al. | |
| 2012/0113801 A1* | 5/2012 | Robinson | H04L 12/4633 370/221 |
| 2013/0198352 A1 | 8/2013 | Kalyanaraman et al. | |

FOREIGN PATENT DOCUMENTS

| | | |
|---|---|---|
| CN | 102185774 A | 9/2011 |
| CN | 102884763 A | 1/2013 |
| CN | 103077082 A | 5/2013 |
| CN | 103095569 A | 5/2013 |
| CN | 104081733 A | 10/2014 |

OTHER PUBLICATIONS

Andrew J. F. Bravery. "Achieving high availability across multiple sites usingIBM PureApplication System, IBM developer works". http://blogs.vmware.com/networkvirtualization/2013/09/vmware_nsx_cisco.html/, May 22, 2013, total 9 pages.
HybridCloud with Microsoft Azure Virtual Networks Overview #sysctr #Azure #SCVMM&#SDN, https://mountainss.wordpress.com/2014/05/, May 24, 2014, total 26 pages.
Brad Hedlund, "The Network Virtualization Blog, Seven reasons VMware NSX, Cisco UCS and Nexus are orders of magnitude more awesome together", http://www.ibm.com/developerworks/cloud/library/cl-ps-aim1305-hadrmultisites/, Sep. 4, 2013, total 13 pages.

* cited by examiner

Continued from FIG. 5A

The virtual switch of the server in the active data center DC1 sends the replaced packet to the virtual machine VM1 of the server in the active data center DC1 according to a destination address carried in the replaced packet — S218

The network controller of the standby data center DC2 determines that the active data center DC1 is faulty — S220

The network controller of the standby data center DC2 sends a message to the tunnel processing device and a virtual resource manager, to notify that the active data center DC1 is faulty — S221

The tunnel processing device empties/deletes a locally-cached tunnel entry of the server in the active data center DC1 or identifies the tunnel entry as unavailable — S222

The network controller of the standby data center DC2 creates a tunnel entry of a server and delivers the tunnel entry to the tunnel processing device — S223

The tunnel processing device receives the tunnel entry of the server that is sent by the network controller of the standby data center DC2, and caches the tunnel entry — S224

The customer edge router receives the service access request that is initiated by the user, where an IP address of the virtual machine VM1 is used as a destination IP address carried in the request — S226

The customer edge router acquires the MAC address of the virtual machine VM1 — S228

After replacing the source MAC address and the destination MAC address in the original packet to form a replaced packet, the customer edge router sends the replaced packet to the tunnel processing device — S230

| Destination MAC address | Source MAC address | 0x0800 | Data | FCS |

| Version (4 bits) | Header length (4 bits) | Service type (8 bits) | Total length (byte count) (16 bits) | |
|---|---|---|---|---|
| Identifier (16 bits) | | | Flag bit (3 bits) | Fragment offset (13 bits) |
| TIL (8 bits) | Protocol (8 bits) | | Header checksum (16 bits) | |
| Source IP address (32 bits) | | | | |
| Destination IP address (32 bits) | | | | |
| Options (if any) | | | | |
| Data | | | | |

FIG. 7

Outer IP packet header:

| Version (4 bits) | Header length (4 bits) | Service type (8 bits) | Total length (byte count) (16 bits) | |
|---|---|---|---|---|
| Identifier (16 bits) | | | Flag bit (3 bits) | Fragment offset (13 bits) |
| TIL (8 bits) | Protocol (8 bits) | | Header checksum (16 bits) | |
| IP address of a source tunnel processing device (32 bits) | | | | |
| IP address of a destination tunnel processing module (32 bits) | | | | |
| Options (if any) | | | | |

Inner MAC packet:

| Destination MAC address (32 bits) | |
|---|---|
| Destination MAC address (16 bits) | Source MAC address (16 bits) |
| Source MAC address (32 bits) | |
| Type (16 bits) | Data |
| Data | |

FIG. 8

METHOD FOR MIGRATING SERVICE OF DATA CENTER, APPARATUS, AND SYSTEM

CROSS-REFERENCE TO RELATED APPLICATIONS

This application is a continuation of International Application No. PCT/CN2014/091250, filed on Nov. 17, 2014, which is hereby incorporated by reference in its entirety.

TECHNICAL FIELD

Embodiments of the present application relate to the communications service field, and in particular, to migrating a service from an active data center to a standby data center.

BACKGROUND

To ensure data security and service continuity, it is generally required to establish a disaster recovery data center at a remote location from an active data center, for disaster recovery of the active data center. When a fault occurs in the active data center because of a natural disaster or the like, the remote disaster recovery data center can directly take over a service of the active data center. In actual applications, the following problem needs to be resolved: how a system can quickly switch a client's destination access address from a server A of the active data center to a server B of the remote disaster recovery data center when a fault occurs on the server A.

One existing solution is a domain name system (DNS) solution. A correspondence between an IP address and a domain name of each virtual machine (VM) is registered on a DNS server. The DNS server detects and updates a status of each virtual machine in real time. When a fault occurs on a virtual machine A in an active data center, a client needs to re-initiate a connection request to the DNS server. The DNS server returns an IP address corresponding to a domain name of a virtual machine B in a disaster recovery data center to the client. The client initiates a session connection to the virtual machine B by using the IP address provided by the DNS server.

Because the quantity of domain names that a DNS server can accommodate is limited, the DNS solution cannot support a massive number of services and it does not have a good expansibility. In addition, for a TCP (Transmission Control Protocol) connection, when a fault occurs at an active site, the quintuple (source IP address, source port, destination IP address, destination port, and TCP protocol), which determines an original TCP connection, changes. This results in a damage of the original connection relationship. A user device needs to re-initiate a link request, which will inevitably cause service interruption and affect user experience.

Another existing solution is a LISP (Locator/ID Separation Protocol) solution, which is an IPinIP protocol. In the LISP solution, an IP address of a routing locator (RLOC) and an IP address of an end-point identifier (EID) are distinguished, and they are encapsulated in a stacked manner. When being transmitted on a public network, an encapsulated packet is forwarded according to the routing locator's IP address only. Only when the packet reaches a site boundary, the outer IP address, the routing locator's IP address, is removed, and the inner IP address, the end-point identifier's IP address, is used for forwarding. However, according to the LISP solution, after a virtual machine is migrated, an ingress tunnel router (ITR) cannot be notified to quickly switch to a new routing locator's IP address. When a virtual machine is just migrated from a site A to a site B, an ITR of the original site A does not know about a new routing locator's IP address, and still uses an original routing locator's IP address as a destination routing locator's IP address for packet encapsulation and sending, which causes service interruption. Connection is re-established and service is restored only after the ITR acquires the new destination routing locator's IP address. In addition, the LISP solution brings a delay problem when an EID is registered to an egress tunnel router (ETR) of the new site B after the virtual machine is migrated. After the virtual machine is migrated, the ETR of the new site B knows that the ETR needs to release a corresponding EID externally and perform registration by using a map server (MS) only when the ETR learns through listening that this IP packet whose address segment is a source IP address appears locally. Therefore, an entire registration process cannot be completed in a timely manner.

SUMMARY

Objectives of embodiments of the present application are to provide a method for migrating a service of a data center, an apparatus, and a system, which can reduce interruption time of the service and quickly implement migration of a virtual machine.

According to a first aspect, a method for migrating a service of a disaster recovery data center is provided, including the following steps:

receiving, by a tunnel processing device, a message notifying that an active data center is faulty, and disabling a locally-saved tunnel entry of a server in the active data center, where the tunnel entry of the server in the active data center includes an IP address of a tunnel processing module deployed on the server in the active data center;

receiving, by the tunnel processing device, a service access request packet sent by a customer edge router, where the service access request packet carries a destination IP address, and the destination IP address is an IP address of a destination virtual machine deployed in the active data center;

acquiring, by the tunnel processing device according to the IP address of the destination virtual machine, an IP address of a tunnel processing module deployed on a server in a standby data center, and encapsulating the service access request packet, where an outer destination IP address of an encapsulated packet is the IP address of the tunnel processing module of the server in the standby data center, and a virtual machine corresponding to the IP address of the destination virtual machine is deployed on the server in the standby data center; and sending, by the tunnel processing device, the encapsulated packet to the customer edge router, so that the customer edge router sends the encapsulated packet to the tunnel processing module of the server in the standby data center according to the outer destination IP address of the encapsulated packet, to implement migration of a data center service from the active data center to the standby data center.

With reference to the first aspect, in a first possible implementation manner of the first aspect, after the step of the disabling a locally-saved tunnel entry of a server in the active data center, the method further includes:

sending, by the tunnel processing device, a request to a network controller of the standby data center, to acquire a tunnel entry of the server in the standby data center; or receiving, by the tunnel processing device, a tunnel entry of the server that is actively delivered by a network controller of the standby data center.

With reference to the first aspect, in a second possible implementation manner of the first aspect, after the step of the receiving, by the tunnel processing device, a service access request packet sent by a customer edge router, the method further includes: sending, by the tunnel processing device according to the service access request packet, a request to a network controller of the standby data center, to acquire a tunnel entry of the server in the standby data center, where the virtual machine corresponding to the IP address of the destination virtual machine is deployed on the server in the standby data center.

With reference to the first aspect and either of the first to the second possible implementation manners of the first aspect, in a third possible implementation manner of the first aspect, before the step of the receiving, by the tunnel processing device, a service access request packet sent by a customer edge router, the method further includes: receiving, by the customer edge router, a service access request packet sent by a user device, and replacing a source MAC address and a destination MAC address in the service access request packet received from the user device, where MAC address information of a service access request packet after the replacement is as follows: a source MAC address is a MAC address of the customer edge router, and a destination MAC address is a MAC address of the destination virtual machine VM.

With reference to the first aspect and any one of the first to the third possible implementation manners of the first aspect, in a fourth possible implementation manner of the first aspect, before the step of the receiving, by a tunnel processing device, a message notifying that an active data center is faulty, the method further includes:

receiving, by the tunnel processing device, the service access request packet sent by the customer edge router, where the service access request packet carries the destination IP address; and acquiring, by the tunnel processing device according to the destination IP address, the tunnel entry of the server in the active data center from a network controller of the active data center, so that the tunnel processing device encapsulates the service access request packet, where the outer destination address of the encapsulated packet is the IP address of the tunnel processing module of the server in the active data center.

With reference to the first or the second possible implementation manner of the first aspect, in a fifth possible implementation manner of the first aspect, the tunnel entry of the server in the active data center includes: the IP address and a MAC address of the destination virtual machine VM deployed on the server in the active data center;

the tunnel entry of the server in the standby data center includes: the IP address of the tunnel processing module deployed on the server in the standby data center, an IP address of the destination virtual machine VM deployed on the server in the standby data center, and a corresponding MAC address, where the IP address of the destination virtual machine VM deployed on the server in the active data center and the IP address of the destination virtual machine VM deployed on the server in the standby data center are the same; and the step of the acquiring, by the tunnel processing device according to the IP address of the destination virtual machine, an IP address of a tunnel processing module deployed on a server in a standby data center is specifically:

querying, by the tunnel processing device according to the IP address of the destination virtual machine, the tunnel entry of the server in the standby data center to acquire the IP address of the tunnel processing module deployed on the server in the standby data center.

With reference to the first aspect and any one of the first to the fifth possible implementation manners of the first aspect, in a sixth possible implementation manner of the first aspect, a specific method for disabling a locally-saved tunnel entry of a server in the active data center is:

deleting the locally-saved tunnel entry of the server in the active data center, or identifying the tunnel entry of the server in the active data center as unavailable.

According to a second aspect, a method for migrating a service of a disaster recovery data center is provided, including the following steps:

determining, by a network controller of a standby data center, that an active data center is faulty;

sending, by the network controller of the standby data center, a message to a tunnel processing device and a virtual resource manager of the standby data center, to notify that the active data center is faulty, so that the virtual resource manager instructs a server in the standby data center to start a virtual machine;

creating, by the network controller of the standby data center, a tunnel entry of the server in the standby data center; and sending, by the network controller of the standby data center, the tunnel entry of the server in the standby data center to the tunnel processing device, so that the tunnel processing device encapsulates a service access request packet according to the tunnel entry of the server in the standby data center, where an outer destination address of an encapsulated packet is an IP address of a tunnel processing module of the server in the standby data center, to implement migration of a data center service from the active data center to the standby data center.

With reference to the second aspect, in a first possible implementation manner of the second aspect, the step of the determining, by a network controller of a standby data center, that an active data center is faulty is specifically:

considering, by the network controller of the standby data center, that the active data center is faulty when the network controller of the standby data center discovers that a heartbeat between the network controller of the standby data center and a network controller of the active data center is lost; or considering, by the network controller of the standby data center, that the active data center is faulty when the network controller of the standby data center receives the message used to notify that the active data center is faulty that is sent by the tunnel processing device; or when the network controller of the standby data center discovers that a heartbeat between the network controller of the standby data center and a network controller of the active data center is lost, sending, by the network controller of the standby data center, a message to the tunnel processing device to further query a heartbeat status between the tunnel processing device and the network controller of the active data center; and if a heartbeat is lost, determining that the active data center is faulty.

With reference to the second aspect or the first possible implementation manner of the second aspect, in a second possible implementation manner of the second aspect, before the step of the sending, by the network controller of the standby data center, the tunnel entry of the server in the standby data center to the tunnel processing device, the method further includes: receiving, by the network controller of the standby data center, a request message that requests the tunnel entry of the server in the standby data center and that is sent by the tunnel processing device.

With reference to the second aspect and any one of the first to the second possible implementation manners of the second aspect, in a third possible implementation manner of the second aspect, the step of the sending, by the network controller of the standby data center, the tunnel entry of the server in the standby data center to the tunnel processing device is specifically: receiving, by the network controller of the standby data center, information about the started virtual machine on the server in the standby data center that is sent by the virtual resource manager of the standby data center; creating the tunnel entry of the server in the standby data center according to the received information about the virtual machine; and delivering, by the network controller of the standby data center, the created tunnel entry to the tunnel processing device.

According to a third aspect, a tunnel processing device is provided and applied to a system for migrating a service of a data center, including:

a first receiving unit, configured to receive a message notifying that an active data center is faulty;

a processing unit, configured to: after the message notifying that the active data center is faulty is received, disable a locally-saved tunnel entry of a server in the active data center, where the tunnel entry of the server in the active data center includes an IP address of a tunnel processing module deployed on the server in the active data center;

a second receiving unit, configured to receive a service access request packet sent by a customer edge router, where the service access request packet carries a destination IP address, and the destination IP address is an IP address of a destination virtual machine deployed in the active data center;

an encapsulating unit, configured to acquire, according to the IP address of the destination virtual machine, an IP address of a tunnel processing module deployed on a server in a standby data center, and encapsulate the service access request packet, where an outer destination IP address of an encapsulated packet is the IP address of the tunnel processing module of the server in the standby data center, and a virtual machine corresponding to the IP address of the destination virtual machine is deployed on the server in the standby data center; and a sending unit, configured to send the encapsulated packet to the customer edge router, so that the customer edge router sends the encapsulated packet to the tunnel processing module of the server in the standby data center according to the outer destination IP address of the encapsulated packet, to implement migration of a data center service from the active data center to the standby data center.

With reference to the third aspect, in a first possible implementation manner of the third aspect, the tunnel processing device further comprises:

a fault detection unit, configured to detect whether the active data center is faulty by using a heartbeat mechanism.

With reference to the third aspect, in a first possible implementation manner of the third aspect, the tunnel processing device further comprises:

the sending unit is further configured to send a request to a network controller of the standby data center, to acquire a tunnel entry of the server in the standby data center.

According to a fourth aspect, a network controller is provided and applied to a system for migrating a service of a data center, including:

a fault determining unit, configured to determine that an active data center is faulty;

a fault notification unit, configured to: when the active data center is faulty, send a message to a tunnel processing device and a virtual resource manager of a standby data center, to notify that the active data center is faulty, so that the virtual resource manager instructs a server in the standby data center to start a virtual machine;

an acquiring unit, configured to acquire a tunnel entry of the server in the standby data center; and a sending unit, configured to send, the tunnel entry of the server in the standby data center to the tunnel processing device, so that the tunnel processing device encapsulates a service access request packet according to the tunnel entry of the server in the standby data center, where an outer destination address of an encapsulated packet is an IP address of a tunnel processing module of the server in the standby data center, to implement migration of a data center service from the active data center to the standby data center.

With reference to the fourth aspect, in a first possible implementation manner of the fourth aspect, the tunnel entry comprises: the IP address of the tunnel entry of the tunnel processing module of the server in the standby data center, an IP address of a destination virtual machine VM, and a MAC address of the destination virtual machine VM.

According to a fifth aspect, a data center system is provided, including:

a customer edge router, configured to receive a service access request packet of a user device and forward the service access request packet to a tunnel processing device for encapsulation processing;

the tunnel processing device according to the third aspect of the present application;

a network controller of an active data center, configured to receive registration information of the tunnel processing device;

a server in the active data center, on which at least one destination virtual machine VM and a tunnel processing module are deployed, where the tunnel processing module is configured to perform decapsulation processing on an encapsulated packet;

the network controller according to the fourth aspect of the present application; and a server in a standby data center, on which at least one destination virtual machine VM and a tunnel processing module are deployed, where the tunnel processing module is configured to perform decapsulation processing on an encapsulated packet.

With reference to the fifth aspect, in a first possible implementation manner of the fifth aspect, an IP address of the at least one destination virtual machine VM deployed on the server in the active data center and an IP address of the at least one destination virtual machine VM deployed on the server in the standby data center are the same.

With reference to the fifth aspect, in a second possible implementation manner of the fifth aspect, the network controller of the active data center is further configured to synchronize the registration information of the tunnel processing device to a network controller of the standby data center.

According to a sixth aspect, a method for migrating a service of a data center, including:

receiving, by a tunnel processing device, a service access request packet initiated by a user device, where the service access request packet carries a destination IP address, and the destination IP address is an IP address of a destination virtual machine deployed in the data center;

acquiring, by the tunnel processing device according to the destination IP address, a tunnel entry of a server on which the destination virtual machine of the data center is located from a network controller of the data center, where the tunnel entry of the server includes an IP address of a tunnel processing module of the server on which the destination virtual machine is located, so that the tunnel processing device encapsulates the service access request packet, where an outer destination address of an encapsulated packet is the IP address of the tunnel processing module of the server on which the destination virtual machine of the data center is located;

receiving, by the tunnel processing device, an updated tunnel entry delivered by the network controller of the data center, where the updated tunnel entry includes an IP address of a tunnel processing module of a destination server to which the destination virtual machine is migrated;

receiving, by the tunnel processing device, the service access request packet that carries the destination IP address and that is initiated by the user device;

encapsulating, by the tunnel processing device according to the destination IP address, the service access request packet, where the outer destination IP address of the encapsulated packet is the IP address of the tunnel processing module of the destination server to which the destination virtual machine is migrated; and sending, by the tunnel processing device, the encapsulated packet to a customer edge router, so that the customer edge router sends, according to the outer destination IP address of the encapsulated packet, the encapsulated packet to the tunnel processing module of the destination server to which the destination virtual machine is migrated, to implement migration of a data center service.

With reference to the sixth aspect, in a first possible implementation manner of the sixth aspect, the tunnel entry comprises: the IP address of the tunnel processing module deployed on the server in the data center, the IP address of the virtual machine VM deployed on the server in the data center, and a corresponding MAC address.

According to a seventh aspect, a method for migrating a service of a data center is provided, including the following steps:

receiving, by a tunnel processing device, a service access request packet initiated by a user device, where the service access request packet carries a destination IP address, and the destination IP address is an IP address of a destination virtual machine deployed in an first data center;

acquiring, by the tunnel processing device according to the destination IP address, a first tunnel entry of a server in a first data center from a network controller of the first data center, and caching the first tunnel entry;

encapsulating, by the tunnel processing device according to the first tunnel entry, the service access request packet, where an outer destination IP address of an encapsulated packet is an address of a tunnel processing module of the server in the first data center;

receiving, by the tunnel processing device, a second tunnel entry;

receiving, by the tunnel processing device, the service access request packet that carries the destination IP address and that is initiated by the user device;

encapsulating, by the tunnel processing device according to the second tunnel entry, the service access request packet, where an outer destination IP address of an encapsulated packet is an IP address of a tunnel processing module of a server in a second data center; and sending, by the tunnel processing device, the encapsulated packet to a customer edge router, so that the customer edge router sends the encapsulated packet to the tunnel processing module of the server in the second data center according to the outer destination IP address of the encapsulated packet, to implement migration of a data center service from the first data center to the second data center.

With reference to the seventh aspect, in a first possible implementation manner of the seventh aspect, the first tunnel entry comprises: the IP address of the tunnel processing module deployed on the server in the first data center, an IP address of a virtual machine VM deployed on the server in the first data center, and a corresponding MAC address; and the second tunnel entry comprises: the IP address of the tunnel processing module deployed on the server in the second data center, an IP address of a virtual machine VM deployed on the server in the second data center, and a corresponding MAC address.

With reference to the first possible implementation manner of the seventh aspect, in a second possible implementation manner of the seventh aspect, the IP address of the virtual machine VM deployed on the server in the first data center and the IP address of the virtual machine VM deployed on the server in the second data center are the same.

Beneficial effects of the present application are as follows: in the present application, a network controller is used to control tunnels, a dynamic MAC in IP tunnel is established between a customer edge router and each of an active data center and a standby data center, and an IP address of a migrated virtual machine remains unchanged before and after migration, implementing that migration of a service is completed without being perceived by a user device and a service access connection is not interrupted, which can significantly improve user experience.

BRIEF DESCRIPTION OF DRAWINGS

The following briefly introduces the accompanying drawings used in describing the embodiments of the present application.

Figure 5A:
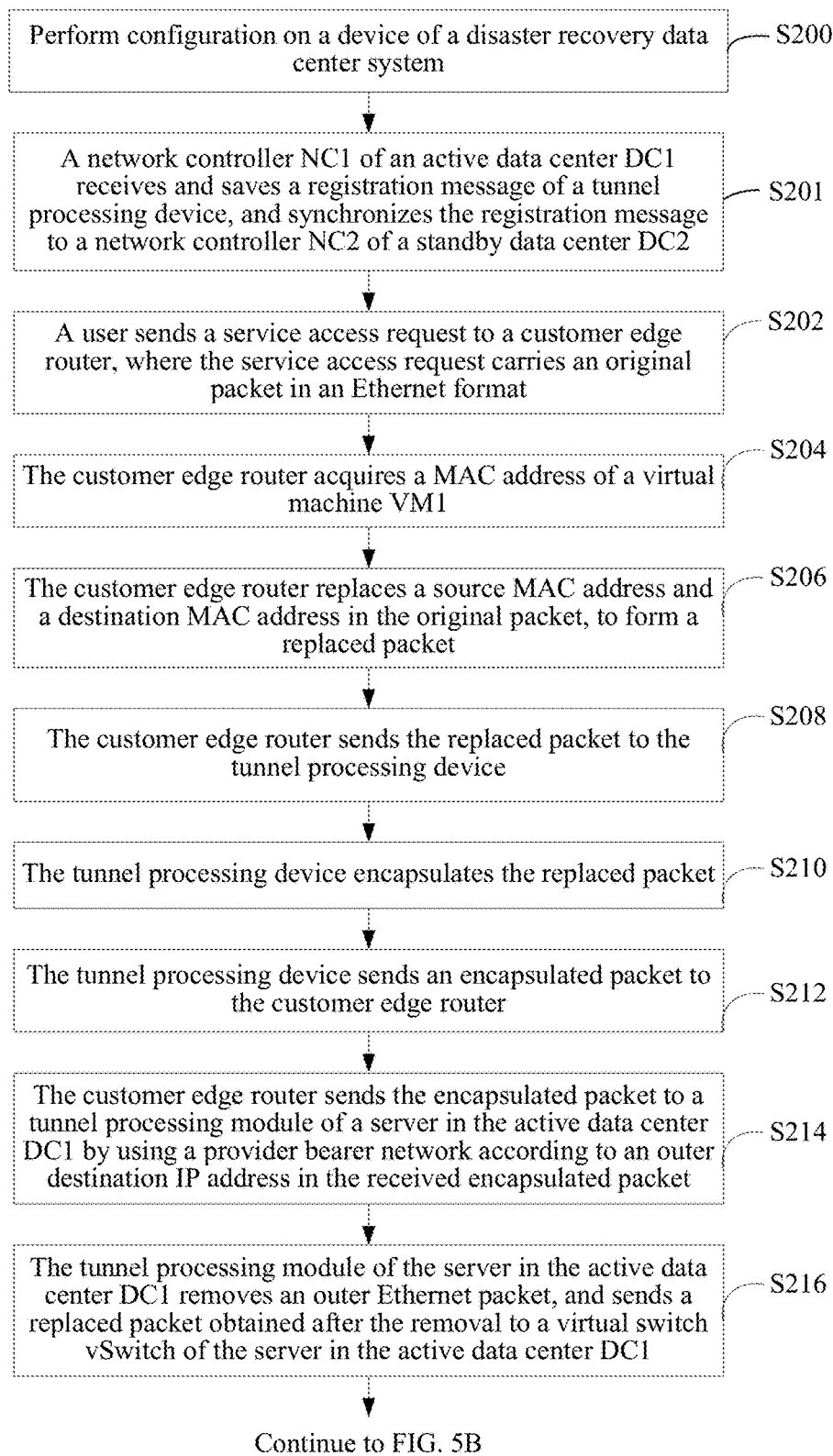
Figure 5C:
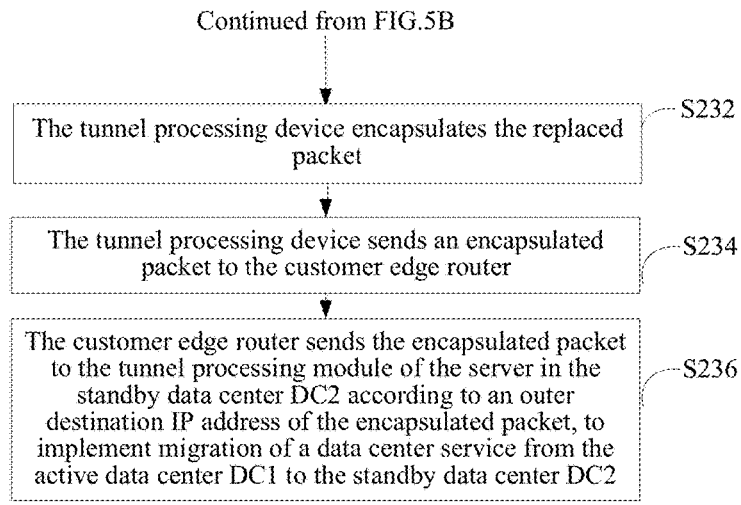
Figure 6:
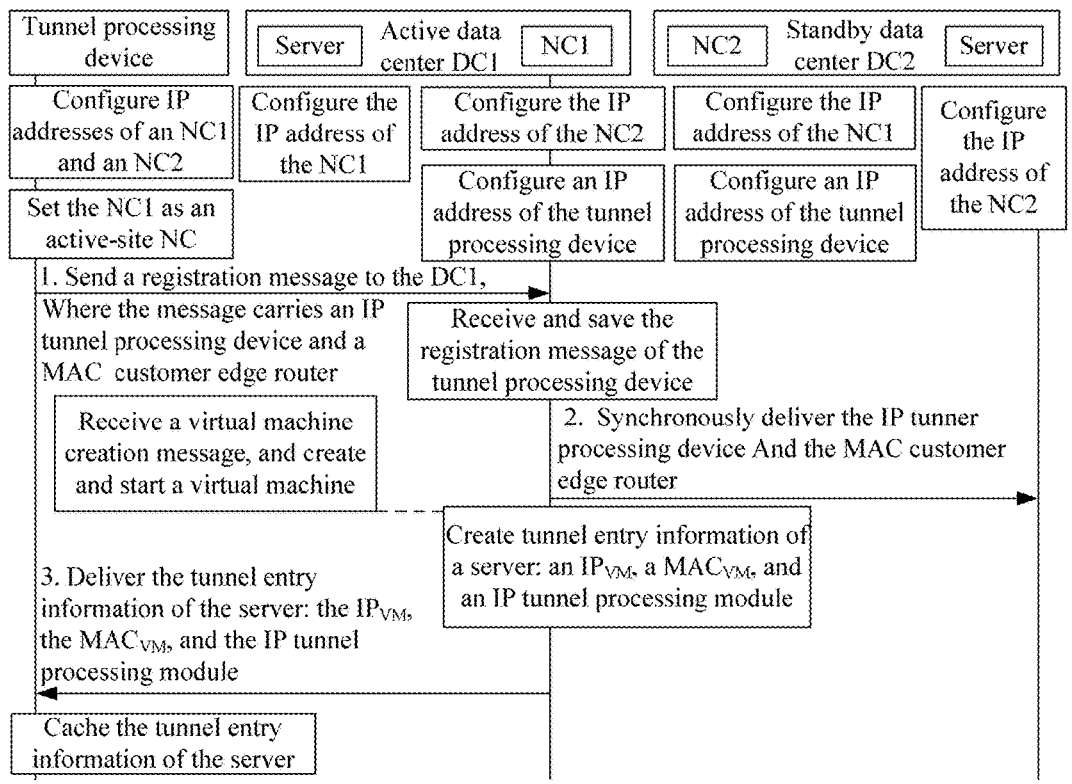
Figure 9:
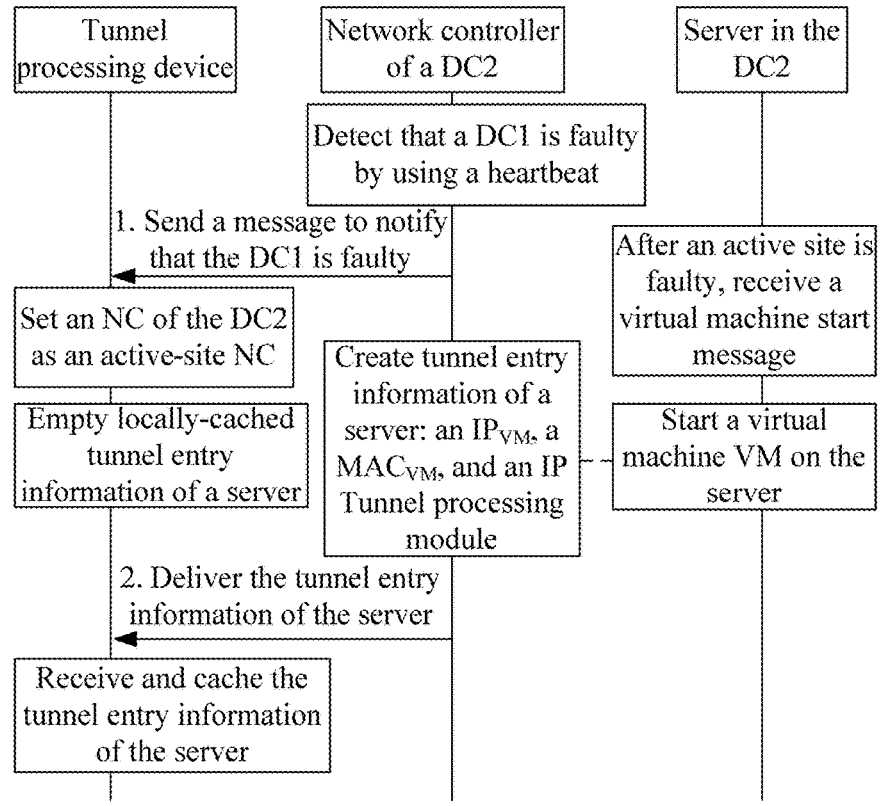
Figure 11:
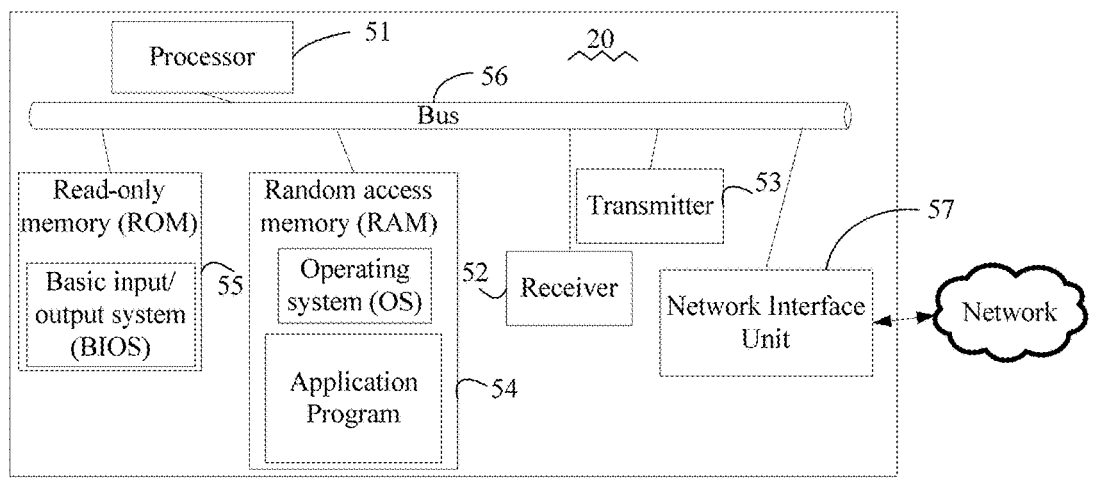
Figure 10A:
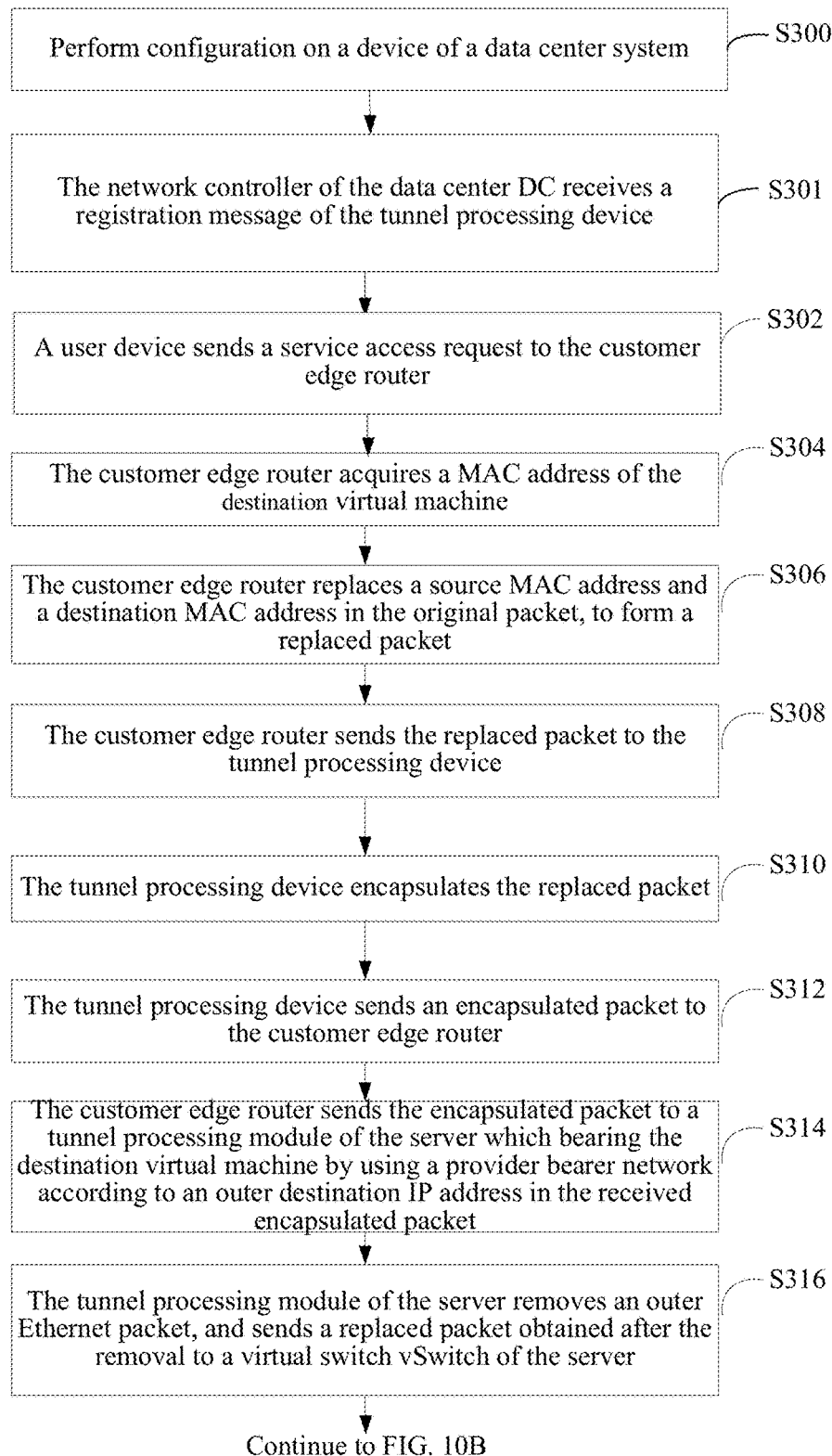
Figure 10B:
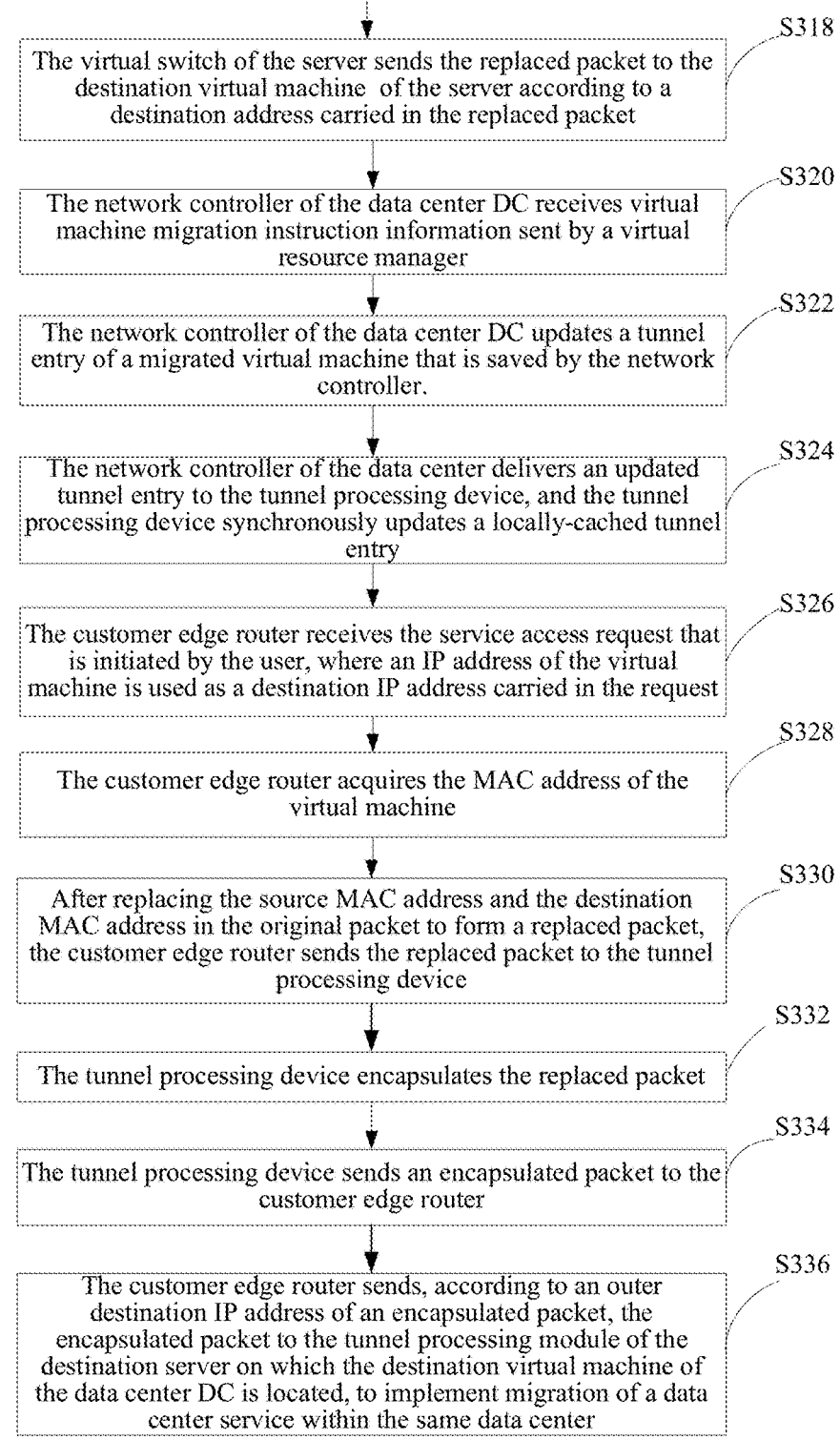

Shown in FIG. 5A to FIG. 5C is a flowchart of a method according to another embodiment of the present application;

FIG. 6 is a schematic diagram of a configuration process according to an embodiment of the present application;

FIG. 7 is a schematic diagram of an original packet according to an embodiment of the present application;

FIG. 8 is a schematic diagram of an encapsulated packet according to an embodiment of the present application;

FIG. 9 is a schematic diagram of a service migration process according to an embodiment of the present application;

Shown in FIG. 10A to FIG. 10B is a flowchart of a method according to yet another embodiment of the present application; and FIG. 11 is a block diagram of a tunnel processing device according to an embodiment of the present application.

DETAILED DESCRIPTION OF EMBODIMENTS

Figure 1:
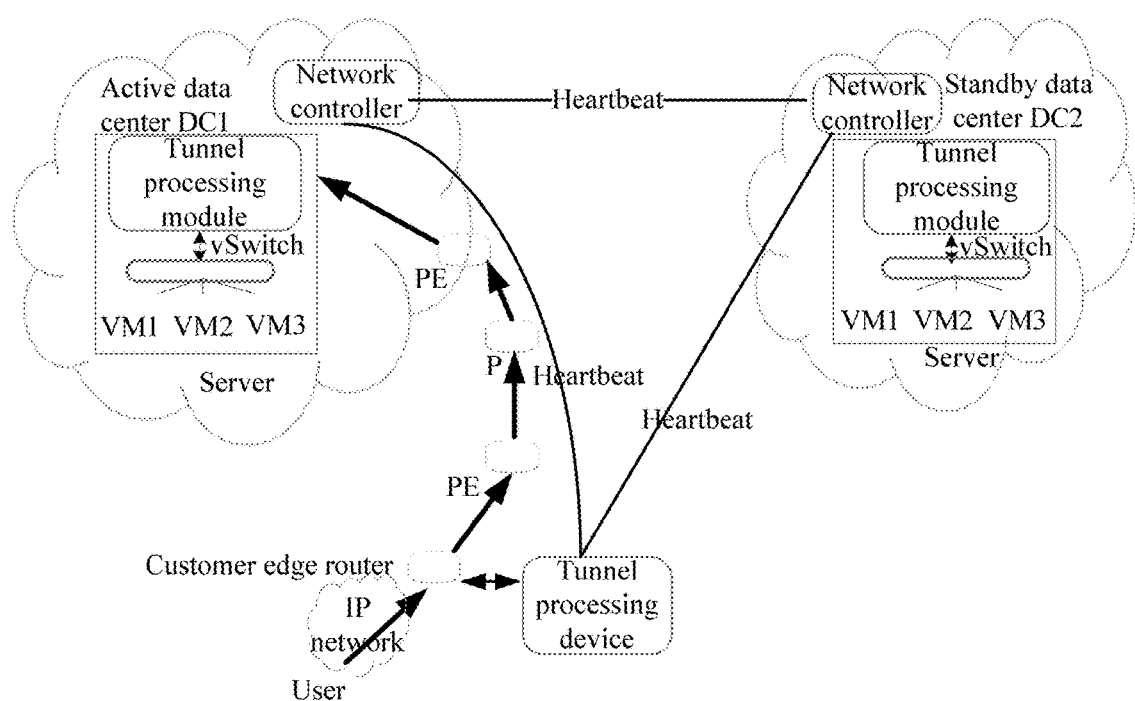
FIG. 1 is an architectural diagram of a system for migrating a service of a disaster recovery data center according to an embodiment of the present application.

Referring to FIG. 1, a disaster recovery data center system according to an embodiment of the present application includes: a customer edge router (CER), a network controller of an active data center (DC) DC1, a server in the active data center DC1, a network controller (NC) of a standby data center DC2, and a server in the standby data center DC2. A user device connects to the customer edge router by using an IP network, and accesses the active data center DC1 by using a bearer network, where the bearer network includes an entity device such as a provider edge device (PE) and a provider device (P).

A virtual switch (vSwitch), a virtual machine (VM), and a tunnel processing module are equipped in each of the servers in the active data center DC1 and the standby data center DC2. The customer edge router may be externally connected to an independent tunnel processing device. Alternatively, the tunnel processing device may be integrated in the customer edge router as an internal functional module of the customer edge router. Any two of the tunnel processing device, the network controller of the active data center DC1, and the network controller of the standby data center DC2 perceive a status of each other by using a heartbeat mechanism.

Figure 2:
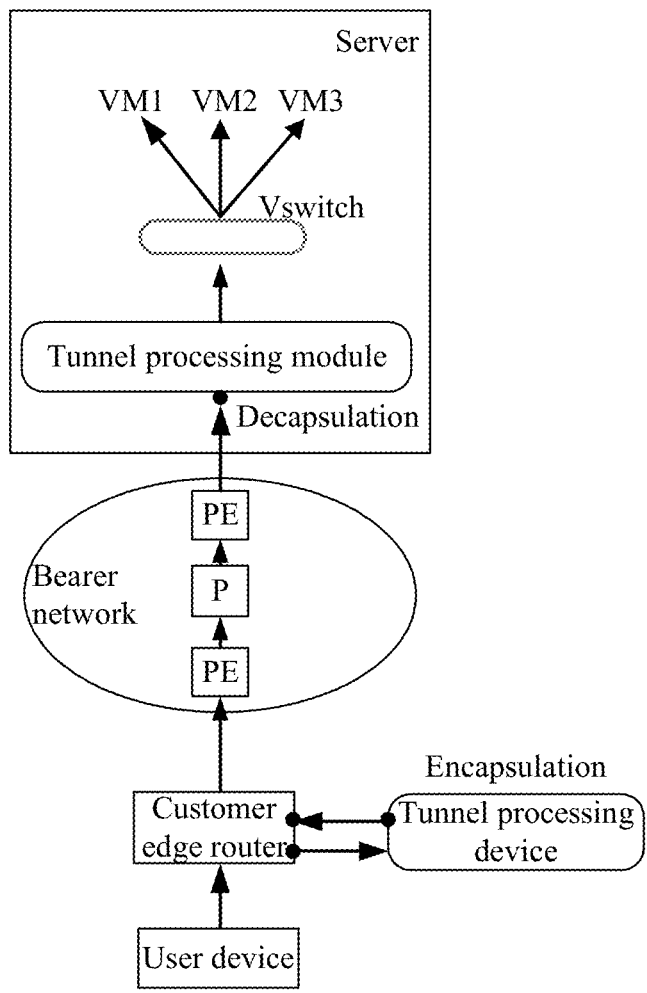
FIG. 2 is a schematic signal flow diagram of a user device accessing a virtual machine of an active data center.

FIG. 2 is a schematic signal flow diagram of a user device accessing a virtual machine of the active data center DC1. When the customer edge router receives a service access request packet of the user device, the tunnel processing device encapsulates the service access request packet. The encapsulated packet is sent to the server in the active data center DC1 by using the bearer network. The tunnel processing module in the server decapsulates the encapsulated packet, and the decapsulated packet is forwarded by the virtual switch (vSwitch) to a corresponding virtual machine of the server in the active data center DC1.

Figure 3:
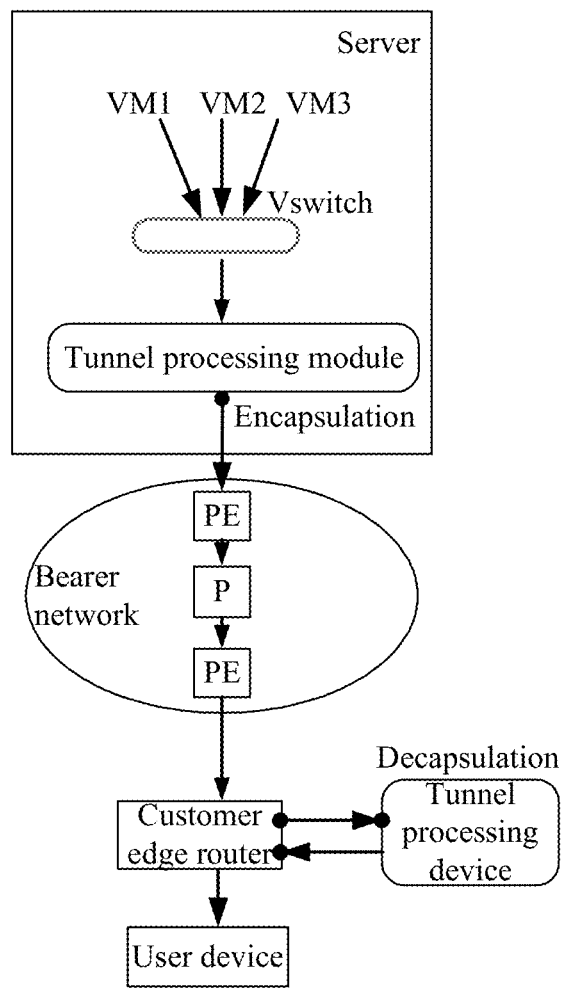
FIG. 3 is a schematic signal flow diagrams of a virtual machine responding to a user device access request.

FIG. 3 is a schematic signal flow diagram of the virtual machine in the active data center DC1 responding to the user access request. When the virtual switch (vSwitch) receives a response packet of the virtual machine, the tunnel processing module encapsulates the response packet. The encapsulated packet is sent to the customer edge router by using the bearer network. The customer edge router forwards the encapsulated packet to the tunnel processing device. The tunnel processing device decapsulates the encapsulated packet, and the decapsulated packet is forwarded to the corresponding user device.

Figure 4:
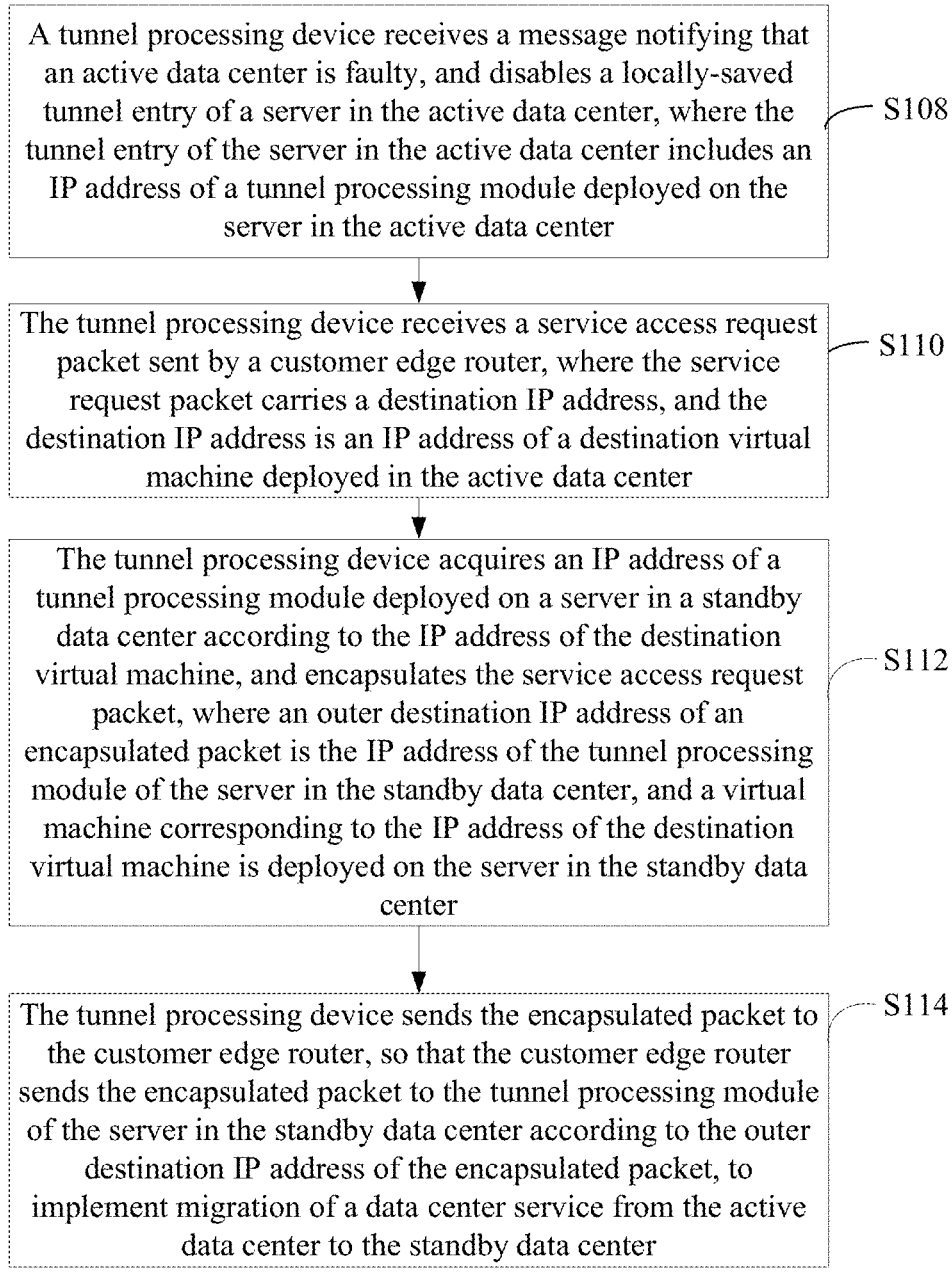
FIG. 4 is a flowchart of a method according to an embodiment of the present application.

As shown in FIG. 4, a method for migrating a service from an active data center to a standby data center according to an embodiment of the present application includes the following:

S108: A tunnel processing device receives a message notifying that an active data center is faulty, and, in response, disables a locally-saved tunnel entry of a server in the faulty active data center. The tunnel entry of the server in the active data center includes an IP address of a tunnel processing module equipped in the server of the active data center.

S110: The tunnel processing device receives a service access request packet from a customer edge router. The service access request packet carries a destination IP address, and the destination IP address is an IP address of a destination virtual machine in the server of the active data center.

S112: The tunnel processing device acquires an IP address of a tunnel processing module equipped in a server in a standby data center according to the IP address of the destination virtual machine in the active data center, and encapsulates the service access request packet. An outer destination IP address of the encapsulated packet is the IP address of the tunnel processing module of the server in the standby data center. A virtual machine, which corresponds to the IP address of the destination virtual machine, is deployed in the server of the standby data center.

S114: The tunnel processing device sends the encapsulated packet to the customer edge router, so that the customer edge router sends the encapsulated packet to the tunnel processing module of the server in the standby data center according to the outer destination IP address of the encapsulated packet. By routing the service access request in the foregoing manner, the migration of a data center service from the active data center to the standby data center is achieved.

In further details, the method for migrating a service from an active data center to a standby data center, as shown in FIGS. 5A-5C, may include the following:

S200: Perform a configuration process on a device of a disaster recovery data center system.

An example of a configuration process is shown in FIG. 6 and it includes the following.

An IP address of a network controller NC2 of a standby data center DC2 is configured on a network controller NC1 of an active data center DC1. An IP address of the network controller NC1 of the active data center DC1 is configured on the network controller NC2 of the standby data center DC2. The network controllers of the active data center and the standby data center perform heartbeat detection and data synchronization between each other. The IP address of the network controller NC1 of the active data center DC1 and the IP address of the network controller NC2 of the standby data center DC2 are configured on a tunnel processing device. An IP address of the tunnel processing device is configured on the network controller NC1 of the active data center DC1 and the network controller NC2 of the standby data center DC2. Heartbeat detection and data exchange are performed between the tunnel processing device and the network controllers of the active data center and the standby data center.

S201: Returning to FIG. 5A, the network controller NC1 of the active data center DC1 receives and saves a registration message of the tunnel processing device, and synchronizes the registration message to the network controller NC2 of the standby data center DC2. The registration message of the tunnel processing device includes: the IP address of the tunnel processing device and a media access control (MAC) address of a customer edge router.

The network controller NC1 of the active data center DC1 creates a tunnel entry of a server and delivers the tunnel entry to the tunnel processing device. In one instance, a virtual resource manager (VRM) of the active data center DC1 notifies the server to create a virtual machine, and the virtual resource manager sends information about the virtual machine to the network controller NC1 of the active data center DC1 after the virtual machine is created. The information about the virtual machine includes: an IP address of a tunnel processing module of the server on which the virtual machine is located, an IP address of each virtual machine VM deployed on the server in the active data center DC1 and a corresponding MAC address. The network controller NC1 creates the tunnel entry of the server according to the information about the virtual machine and delivers the tunnel entry to the tunnel processing device. The tunnel processing device saves information about the tunnel entry of the server, where the tunnel entry includes: an IP address of the tunnel processing module in the server in the active data center DC1, the IP address of each virtual machine VM deployed on the server in the active data center DC1, and the corresponding MAC address.

S202: A user device sends a service access request to the customer edge router, where the service access request carries an original packet in an Ethernet protocol format. An exemplary structure of the original packet is shown in FIG. 7. A source IP address in the original packet is an IP address of the user device. A destination IP address in the original packet is an IP address of a virtual machine VM1 in the server of the active data center DC1. A source MAC address in the original packet is a MAC address of the user device. A destination MAC address in the original packet is a MAC address of a default gateway.

S204: Returning to FIG. 5A, the customer edge router acquires a MAC address of the virtual machine VM1. Specifically, after receiving the original packet, the customer edge router determines whether the MAC address of the virtual machine VM1 is locally cached. If the MAC address of the virtual machine VM1 is locally cached, go to S206; if the MAC address of the virtual machine VM1 is not locally cached, an ARP (Address Resolution Protocol) broadcast packet is sent. After receiving the ARP broadcast packet, the tunnel processing device first queries whether a tunnel entry is locally cached. If no tunnel entry is locally cached, the tunnel processing device acquires the tunnel entry of the server in the active data center DC1 from the network controller NC1 of the active data center DC1 according to the destination IP address (that is, the IP address of the virtual machine VM1) and caches the tunnel entry. Then, the tunnel processing device returns, to the customer edge router, the MAC address of the virtual machine VM1 that is included in the tunnel entry.

S206: The customer edge router replaces the source MAC address and the destination MAC address in the original packet to form a replaced packet. MAC address information of the replaced packet is as follows: a source MAC address is the MAC address of the customer edge router, and the destination MAC address is the MAC address of the virtual machine VM1.

S208: The customer edge router sends the replaced packet to the tunnel processing device.

S210: The tunnel processing device encapsulates the replaced packet. Specifically, the tunnel processing device queries, according to the IP address of the virtual machine VM1, a locally-cached tunnel entry to acquire the IP address of the tunnel processing module of the server in the active data center DC1, and encapsulates the replaced packet to form an encapsulated packet. As an example, a format of the encapsulated packet is shown in FIG. 8, in which an outer source IP address is the IP address of the tunnel processing device, and an outer destination IP address is the IP address of the tunnel processing module of the server in the active data center DC1.

S212: The tunnel processing device sends the encapsulated packet to the customer edge router.

S214: The customer edge router sends the encapsulated packet to the tunnel processing module of the server in the active data center DC1 by using a provider bearer network (such as an multi-protocol label switch (MPLS) network) according to the outer destination IP address in the received encapsulated packet.

S216: The tunnel processing module of the server in the active data center DC1 removes an outer Ethernet packet, and sends a replaced packet obtained after the removal to a virtual switch (vSwitch) of the server in the active data center DC1.

S218: Continuing in FIG. 5B, the virtual switch of the server in the active data center DC1 sends the replaced packet to the virtual machine VM1 of the server in the active data center DC1 according to a destination address carried in the replaced packet.

S220: The network controller of the standby data center DC2 determines that the active data center DC1 is faulty; or another device with a fault determining function determines and notifies the network controller of the standby data center DC2 that the active data center DC1 is faulty. The active data center DC1 is faulty may be determined from the following conditions:

(1) if a heartbeat between the network controller of the active data center DC1 and the network controller of the standby data center DC2 is lost, the network controller of the standby data center DC2 considers that the active data center is faulty; or (2) if a heartbeat between the tunnel processing device and the network controller of the active data center DC1 is lost, the tunnel processing device sends a message to the network controller of the standby data center DC2, to notify that the active data center DC1 is faulty, and the network controller of the standby data center DC2 considers that the active data center DC1 is faulty; or (3) if a heartbeat between the network controller of the active data center DC1 and the network controller of the standby data center DC2 is lost, the network controller of the standby data center DC2 sends a message to the tunnel processing device to further query a heartbeat status between the tunnel processing device and the network controller of the active data center DC1, and if a heartbeat is lost, the network controller of the standby data center DC2 considers that the active data center DC1 is faulty; if no heartbeat is lost, the network controller of the standby data center DC2 considers that a fault occurs on a heartbeat link between the network controller of the active data center DC1 and the network controller of the standby data center DC2, an alarm is sent for maintenance.

S221: The network controller of the standby data center DC2 sends a message to the tunnel processing device and a virtual resource manager of the standby data center DC2, to notify that the active data center DC1 is faulty. A virtual machine corresponding to an IP address of a destination virtual machine is deployed on the server in the standby data center DC2.

S222: The tunnel processing device empties/deletes a locally-cached tunnel entry of the server in the active data center DC1 or identifies the tunnel entry as unavailable. Further, the tunnel processing device identifies a status of the network controller of the standby data center DC2 as active, that is, the network controller of the standby data center DC2 is changed from a standby state to an active state.

S223: The network controller of the standby data center DC2 creates a tunnel entry of the server and delivers the tunnel entry to the tunnel processing device. Specifically, after receiving the message notifying that the active data center DC1 is faulty, the virtual resource manager of the standby data center DC2 notifies the server to create a virtual machine. After the virtual machine is started, the virtual resource manager sends information about the virtual machine to the network controller of the standby data center DC2. The network controller of the standby data center DC2 creates the tunnel entry of the server according to the information about the virtual machine. Then, the network controller of the standby data center DC2 actively delivers the tunnel entry to the tunnel processing device. Alternatively, the tunnel processing device sends a request to the network controller of the standby data center DC2, and the network controller of the standby data center DC2 delivers the tunnel entry to the tunnel processing device according to the request of the tunnel processing device.

The tunnel entry of the server in the standby data center may include: an IP address of a tunnel processing module of the server in the standby data center, the IP address of the destination virtual machine VM deployed on the server in the standby data center, and a corresponding MAC address. The IP address of the destination virtual machine VM deployed on the server in the standby data center and the IP address of the destination virtual machine VM deployed on the server in the active data center are the same.

S224: The tunnel processing device receives the tunnel entry of the server that is sent by the network controller of the standby data center DC2, and caches the tunnel entry, or further identifies the cached tunnel entry of the server as available.

The above S220-S224 are further illustrated in FIG. 9.

S226: The customer edge router receives the service access request that is initiated by the user device, where the IP address of the virtual machine VM1 is used as a destination IP address carried in the request.

S228: The customer edge router acquires the MAC address of the virtual machine VM1. Specifically, after receiving the service access request, the customer edge router determines whether the MAC address of the virtual machine VM1 is locally cached. If the MAC address of the virtual machine VM1 is not locally cached, an ARP broadcast packet is sent. After receiving the ARP broadcast packet, the tunnel processing device first queries whether an available tunnel entry is locally cached (if there is no tunnel entry or there is a tunnel entry but a state of the tunnel entry is identified as unavailable, it is considered that there is no available tunnel entry). If no available tunnel entry is locally cached, the tunnel processing device acquires the tunnel entry of the server in the standby data center DC2 from the network controller of the standby data center DC2 according to the destination IP address (that is, the IP address of the virtual machine VM1) and caches the tunnel entry. Then, the tunnel processing device returns, to the customer edge router, the MAC address of the virtual machine VM1 that is included in the tunnel entry.

The tunnel entry may include: the IP address of the tunnel processing module deployed on the server in the standby data center DC2, the IP address of the virtual machine VM deployed on the server in the standby data center DC2, and the MAC address of the virtual machine VM1. The IP address of the virtual machine VM1 deployed on the server in the standby data center DC2 and the IP address of the virtual machine VM1 deployed on the server in the active data center are the same.

S230: After replacing the source MAC address and the destination MAC address in the service access request packet, to form a replaced packet, the customer edge router sends the replaced packet to the tunnel processing device. MAC address information of the replaced packet is as follows: the source MAC address is the MAC address of the customer edge router, and the destination MAC address is the MAC address of the destination virtual machine VM1.

S232: The tunnel processing device encapsulates the replaced packet. Specifically, the tunnel processing device queries the tunnel entry of the server in the standby data center according to the IP address of the destination virtual machine, to acquire the IP address of the tunnel processing module of the server in the standby data center DC2, and encapsulates the replaced packet. An outer destination IP address of an encapsulated packet is the IP address of the tunnel processing module of the server in the standby data center DC2, and an inner destination MAC address of the encapsulated packet is the MAC address of the virtual machine VM1.

S234: The tunnel processing device sends the encapsulated packet to the customer edge router.

S236: The customer edge router sends the encapsulated packet to the tunnel processing module of the server in the standby data center DC2 according to the outer destination IP address of the encapsulated packet, to implement migration of a data center service from the active data center DC1 to the standby data center DC2.

Certainly, each of the active data center DC1 and the standby data center DC2 may have one server or multiple servers. For example, the active data center DC1 has M servers, and the standby data center DC2 has N servers. If X virtual machines are required to be migrated from the M servers in the active data center DC1 to the N servers in the standby data center DC2, it is only required to update tunnel entries of the M servers corresponding to the X virtual machines to tunnel entries of the N servers corresponding to the X virtual machines.

It can be understood that application fields of the present application can be extended to scenarios in which even if no fault has occurred in either of the two data centers, when some or all services of a data center need to be migrated to the other data center due to a service requirement. In this case, a tunnel processing device updates, according to an instruction, some or all of locally-cached tunnel entries, and the tunnel processing device only needs to encapsulate a service access request packet according to an updated tunnel entry.

In addition, the present application also applies to a scenario in which a virtual machine is migrated within a same data center, where the data center has at least two servers, and the virtual machine is migrated from one server to another server in the same data center. This virtual machine is called a migrated virtual machine. A specific process is shown in FIG. 10A to FIG. 10B.

S300: Perform configuration on a device of a data center system. Specifically, an IP address of a network controller is configured on a tunnel processing module of a server of a data center DC, so that the server and the network controller interact with each other; an IP address of the network controller of the data center DC is configured on the tunnel processing module, and an IP address of the tunnel processing module is configured on the network controller of the data center DC, so that the tunnel processing device and the network controller of the data center perform heartbeat detection and data exchange.

S301: The network controller of the data center DC receives a registration message of the tunnel processing device, where the registration message of the tunnel processing device includes: an IP address of the tunnel processing device and a MAC address of a customer edge router.

A virtual resource manager of the data center DC creates a virtual machine, and after the virtual machine is started, the virtual resource manager notifies the network controller of the data center DC of information about the virtual machine, where the information about the virtual machine includes: an IP address of a tunnel processing module of a server on which the virtual machine is located, an IP address of each virtual machine VM deployed on the server in the data center DC, and a corresponding MAC address. The network controller of the data center DC creates a tunnel entry of a server according to the information about the virtual machine and delivers the tunnel entry to the tunnel processing device, so that the tunnel processing device caches the tunnel entry of the server, where the tunnel entry includes: the IP address of the tunnel processing module deployed on the server in the data center DC, the IP address of each virtual machine VM deployed on the server in the data center DC, and the corresponding MAC address.

S302: A user device sends a service access request to the customer edge router, where the service access request carries an original packet in an Ethernet format. The service access request packet carries a destination IP address, and the destination IP address is an IP address of a destination virtual machine deployed in the data center.

Steps S304 to S318 are similar to steps S204 to S218 in the foregoing embodiment (FIGS. 5A-5B), and are not described herein again.

S320: The network controller of the data center DC receives virtual machine migration instruction information sent by a virtual resource manager, where the instruction information includes identification information of a destination server.

S322: The network controller of the data center DC updates a tunnel entry of a migrated virtual machine that is saved by the network controller. A specific updating operation is as follows: the network controller of the data center finds a corresponding tunnel entry according to an IP address and a MAC address of the migrated virtual machine, and updates an IP address of an original tunnel processing module that is in the tunnel entry to an IP address of a tunnel processing module of the destination server of the migrated virtual machine.

Preferably, S322 is executed after virtual machine migration is complete.

S324: The network controller of the data center delivers an updated tunnel entry to the tunnel processing device, and the tunnel processing device synchronously updates a locally-cached tunnel entry.

Steps S326 to S334 are similar to steps S226 to S234 in the foregoing embodiment (FIGS. 5B-5C), and are not described herein again.

S336: The customer edge router sends, according to an outer destination IP address of an encapsulated packet, the encapsulated packet to the tunnel processing module of the destination server on which the destination virtual machine of the data center DC is located, to implement migration of a data center service within the same data center.

FIG. 11 is a simplified block diagram of a tunnel processing device according to an embodiment of the present application. The tunnel processing device 20 includes some or all of a processor 51, a receiver 52, a transmitter 53, a random access memory 54, a read-only memory 55, a bus 56, and a network interface unit 57. The processor 51 is separately coupled to the receiver 52, the transmitter 53, the random access memory 54, the read-only memory 55, and the network interface unit 57 by using the bus 56. When it is required to run a control entity, a system is booted to start by using a basic input/output system integrated in the read-only memory 55 or a boot loader in an embedded system, to boot the data center to enter a normal running state. After the tunnel processing device 20 enters the normal running state, an application program and an operating system are run in the random access memory 54, to receive data from a network or send data to a network.

The receiver 52 is configured to receive a service access request packet initiated by a user device, where the service access request packet carries a destination IP address.

The processor 51 is configured to: when an active data center is faulty, disable a locally-cached tunnel entry of a server in the active data center; acquire a tunnel entry of a server in a standby data center from a network controller of the standby data center according to the destination IP address, encapsulate the service access request packet, where an outer destination address of an encapsulated packet is an IP address of a tunnel processing module of the server in the standby data center, to implement migration of a data center service from the active data center to the standby data center.

The transmitter 53 is configured to send an instruction.

In this embodiment, the processor 51 may be a central processing unit (CPU), or an application-specific integrated circuit (ASIC), or one or more integrated circuits configured to implement the process as set forth in embodiments of this application.

In the present application, a network controller is used to control tunnels, and a tunnel is established between a customer edge router and active and standby data centers. Migration of a service is completed without being perceived by a user device, and a service access connection is not interrupted, which can significantly improve user experience.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions.

When the functions are implemented in a form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The software product is stored in a storage medium, and includes program codes for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for migrating a service of an active data center, comprising:
in response to a message notifying that the active data center is faulty, a tunnel processing device disabling a locally-saved tunnel entry of a server in the active data center, wherein the tunnel entry of the server in the active data center comprises an IP address of a tunnel processing module deployed on the server in the active data center;

receiving, by the tunnel processing device, a service access request packet from a customer edge router, wherein the service access request packet carries a destination IP address, and the destination IP address is an IP address of a first virtual machine deployed in the active data center;

acquiring, by the tunnel processing device according to the IP address of the first virtual machine, an IP address of a tunnel processing module deployed on a server in a standby data center;

encapsulating, by the tunnel processing device, the service access request packet, wherein an outer destination IP address of the encapsulated service access request packet is the IP address of the tunnel processing module of the server in the standby data center, and a second virtual machine corresponding to the IP address of the first virtual machine is deployed on the server in the standby data center; and sending, by the tunnel processing device, the encapsulated service access request packet to the customer edge router, so that the customer edge router sends the encapsulated service access request packet to the tunnel processing module of the server in the standby data center according to the outer destination IP address of the encapsulated service access request packet, to implement the migration of the service from the active data center to the standby data center.

2. The method according to claim 1, further comprising: after disabling the locally-saved tunnel entry of the server in the active data center, sending, by the tunnel processing device, a request to a network controller of the standby data center, to acquire a tunnel entry of the server in the standby data center.

3. The method according to claim 2, wherein:
the tunnel entry of the server in the active data center comprises: the IP address and a MAC address of the first virtual machine deployed on the server in the active data center;
the tunnel entry of the server in the standby data center comprises: the IP address of the tunnel processing module deployed on the server in the standby data center, an IP address of the second virtual machine deployed on the server in the standby data center, and a corresponding MAC address,
and wherein the IP address of the first virtual machine deployed on the server in the active data center and the IP address of the second virtual machine deployed on the server in the standby data center are the same.

4. The method according to claim 3, wherein acquiring, by the tunnel processing device according to the IP address of the first virtual machine, an IP address of a tunnel processing module deployed on a server in a standby data center comprises:
querying, by the tunnel processing device according to the IP address of the first virtual machine, the tunnel entry of the server in the standby data center to acquire the IP address of the tunnel processing module deployed on the server in the standby data center.

5. The method according to claim 1, further comprising: after disabling the locally-saved tunnel entry of the server in the active data center, receiving, by the tunnel processing device, a tunnel entry of the server in the standby data center, wherein the tunnel entry of the server in the standby data center is actively delivered by a network controller of the standby data center.

6. The method according to claim 1, further comprising: after receiving the service access request packet from the customer edge router, sending, by the tunnel processing device according to the service access request packet, a request to a network controller of the standby data center, to acquire a tunnel entry of the server in the standby data center, wherein the second virtual machine corresponding to the IP address of the first virtual machine is deployed on the server in the standby data center.

7. The method according to claim 1, further comprising:
receiving, by the customer edge router, a service access request packet from a user device; and
replacing, by the customer edge router, a source MAC address and a destination MAC address in the service access request packet received from the user device, wherein after the replacement, the source MAC address is a MAC address of the customer edge router, and the destination MAC address is a MAC address of the first virtual machine.

8. The method according to claim 1, wherein disabling the locally-saved tunnel entry of the server in the active data center comprises:
deleting the locally-saved tunnel entry of the server in the active data center.

9. The method according to claim 1, wherein disabling the locally-saved tunnel entry of a server in the active data center comprises:
identifying the tunnel entry of the server in the active data center as unavailable.

10. A tunnel processing device, comprising a receiver, a processor and a transmitter, wherein:
the processor is configured to, in response to a message notifying that an active data center is faulty, disable a locally-saved tunnel entry of a server in the active data center, wherein the tunnel entry of the server in the active data center comprises an IP address of a tunnel processing module deployed on the server in the active data center;
the receiver is configured to receive a service access request packet from a customer edge router, wherein the service access request packet carries a destination IP address, and the destination IP address is an IP address of a first virtual machine deployed in the active data center;
the processor is further configured to:
acquire, according to the IP address of the first virtual machine, an IP address of a tunnel processing module deployed on a server in a standby data center; and
encapsulate the service access request packet, wherein an outer destination IP address of the encapsulated service access request packet is the IP address of the tunnel processing module of the server in the standby data center, and a second virtual machine corresponding to the IP address of the first virtual machine is deployed on the server in the standby data center;
and the transmitter is configured to: send the encapsulated service access request packet to the customer edge router, so that the customer edge router sends the encapsulated service access request packet to the tunnel processing module of the server in the standby data center according to the outer destination IP address of the encapsulated service access request packet, to implement a migration of a service from the active data center to the standby data center.

11. The tunnel processing device according to claim 10, wherein the transmitter is further configured to:

after the locally-saved tunnel entry of the server in the active data center is disabled, send a request to a network controller of the standby data center, to acquire a tunnel entry of the server in the standby data center.

12. The tunnel processing device according to claim 10, wherein the receiver is further configured to:

after the locally-saved tunnel entry of the server in the active data center is disabled, receive a tunnel entry of the server in the standby data center, wherein the tunnel entry of the server in the standby data center is actively delivered by a network controller of the standby data center.

13. The tunnel processing device according to claim 10, wherein the transmitter is further configured to:

after the service access request packet is received from the customer edge router, send, according to the service access request packet, a request to a network controller of the standby data center, to acquire a tunnel entry of the server in the standby data center, wherein the second virtual machine corresponding to the IP address of the first virtual machine is deployed on the server in the standby data center.

14. A computer program product comprising a non-transitory computer readable storage medium storing a program for use by a tunnel processing device, wherein the program comprises instructions for:

in response to a message notifying that an active data center is faulty, disabling a locally-saved tunnel entry of a server in the active data center, wherein the tunnel entry of the server in the active data center comprises an IP address of a tunnel processing module deployed on the server in the active data center;

receiving a service access request packet from a customer edge router, wherein the service access request packet carries a destination IP address, and the destination IP address is an IP address of a first virtual machine deployed in the active data center;

acquiring, according to the IP address of the first virtual machine, an IP address of a tunnel processing module deployed on a server in a standby data center;

encapsulating the service access request packet, wherein an outer destination IP address of the encapsulated service access request packet is the IP address of the tunnel processing module of the server in the standby data center, and a second virtual machine corresponding to the IP address of the first virtual machine is deployed on the server in the standby data center; and sending the encapsulated service access request packet to the customer edge router, so that the customer edge router sends the encapsulated service access request packet to the tunnel processing module of the server in the standby data center according to the outer destination IP address of the encapsulated service access request packet, to implement a migration of a service from the active data center to the standby data center.

15. The computer program product according to claim 14, wherein the program further comprises instructions for:

after disabling the locally-saved tunnel entry of the server in the active data center, sending a request to a network controller of the standby data center, to acquire a tunnel entry of the server in the standby data center.

16. The computer program product according to claim 14, wherein the program further comprises instructions for:

after disabling the locally-saved tunnel entry of the server in the active data center, receiving a tunnel entry of the server in the standby data center, wherein the tunnel entry of the server in the standby data center is actively delivered by a network controller of the standby data center.

17. The computer program product according to claim 14, wherein the program further comprises instructions for:

after receiving the service access request packet from the customer edge router, sending, according to the service access request packet, a request to a network controller of the standby data center, to acquire a tunnel entry of the server in the standby data center, wherein the second virtual machine corresponding to the IP address of the first virtual machine is deployed on the server in the standby data center.

* * * * *